Nov. 5, 1968     J. O. BURKE     3,409,820
ELECTRIC POWER APPARATUS
Filed July 10, 1964
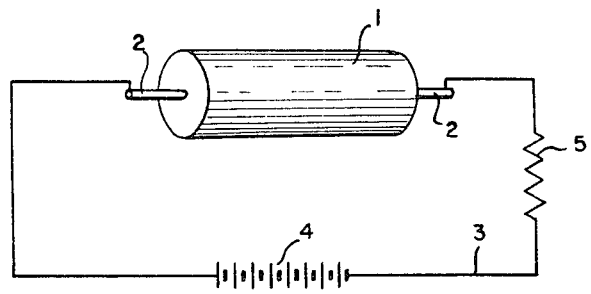
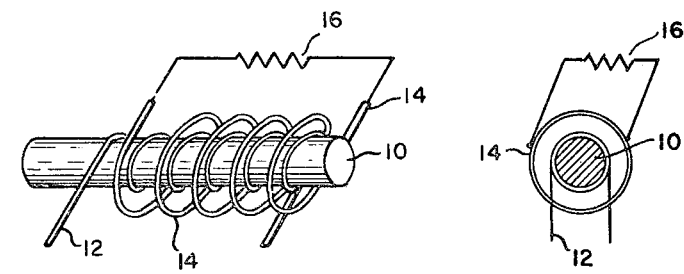
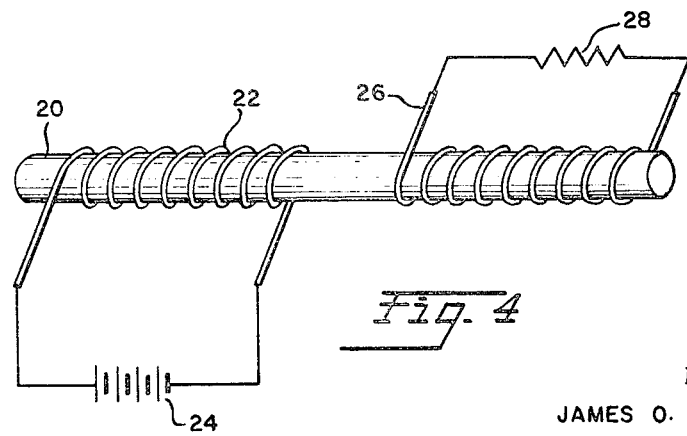
INVENTOR
JAMES O. BURKE
BY *S. William King*
ATTORNEY

United States Patent Office 3,409,820
Patented Nov. 5, 1968

3,409,820
ELECTRIC POWER APPARATUS
James O. Burke, 4705 Rolfe Road,
Richmond, Va. 23226
Filed July 10, 1964, Ser. No. 381,754
8 Claims. (Cl. 322—2)

This invention relates primarily to methods of amplifying electric current, apparatus therefor and, generally speaking, to electric generating systems.

The basis for the present invention is the principle that electric current may be amplified by passing it through radioactive material. Passing current through a conductor in contact with radioactive material or under the influence of radiation therefrom, results in amplification of the input current. Such a system has high practical value in atomic powered craft such as submarines, airplanes and space ships. In submarines for example, technological advances in batteries have produced smaller, more powerful batteries occupying less valuable space; however, there still is a definite need to reduce the size and weight power sources such as this to a minimum. The present invention fulfills such a need by utilizing radioactive material in the main power plant to amplify current from one or more batteries and thus reduce the original battery weight and volume requirements.

Thus, by employing the basic principle, this invention has application in any field in which electricity may be used, employing a motor, embodying a radioactive material or in existing electrical systems with radioactive material added to amplify the electric current available.

It is therefore the primary object of this invention to provide a method of amplifying or enlarging existing electrical energy or current, and to further provide a novel electrical power system, utilizing radioactive emissions or radiations.

Another object of this invention is to provide a method and system of enlarging or amplifying electric current from radioactive material.

Another object is to provide and improve electrical power supply systems which may be relatively lightweight and small in size and therefore adaptable for advantageous use in high altitude apparatus and craft.

Other objects and advantages of the present invention will become apparent to those skilled in this art from the following description of the best mode of carrying out this invention and examples thereof, made in connection with the accompanying drawing wherein:

FIGURE 1 schematically illustrates a circuit embodying the basic principle of this invention;

FIGURE 2 illustrates a transformer-like apparatus in side elevation constructed in accordance with the principle of this invention;

FIGURE 3 is an end view of the apparatus of FIGURE 2; and

FIGURE 4 is a side elevation view of another transformer-like apparatus.

Referring to schematic FIGURE 1, wherein the best mode of carrying out the present invention is illustrated, a circuit is shown comprised of a copper cannister 1 filled with radioactive strontium 90. Conductive contacts 2 of the same material as the cannister extend from opposite ends thereof and are conductively connected with a suitable electric conductor such as copper wire 3. A source of electrical energy 4 which, in this embodiment is preferably a battery, supplies input current to cannister 1, where it is conducted through the cannister and subjected to the radiation of strontium contained in the cannister, resulting in amplification of the battery-supplied current. Current thus passing through the cannister and being amplified is then collected in conductor 3 and transmitted to a workload 5, which may be any conventional device adapted to be operated by, or to otherwise utilize, electric current.

The radioactive material in cannister 1 is preferably strontium 90, but may be any radioactive emitter, emitting alpha, beta, gamma or otherwise designated particles or waves, including neutrons, protons, etc., and/or any combination thereof.

The radioactive material contained in cannister 1 may be heated from an external source or from the heat of nuclear radiation of the radioactive material itself, to increase the amplifying effect on the current in the circuit described in FIGURE 1, but such heating is not necessary or essential to the current amplification system described in connection with FIGURE 1. Current passing through the conductive cannister is enhanced by the emissions from the radioactive material in either case resulting in a current in excess of the sum of the currents produced by the battery and radioactive material individually.

From the description of FIGURE 1, it can be seen that this invention relates to the amplification of electric current by the emissions from radioactive material through which current is caused to flow, and also is that the electric discharge of the radioactive material is enhanced by causing an electric current to flow through the radioactive material. It is not known how this amplification physically occurs, but it is thought most probably that the radioactive material excites or stimulates the input current. In any event, the term amplification is intended to mean merely that the output current from the radioactive material is larger in terms of amperage than the input current as from source 4 in FIGURE 1. There are many possible physical arrangements whereby an electric current can be made to pass through a radioactive material, and broadly speaking, the present invention is intended to encompass any such arrangement in which emissions from radioactive material and/or electric current induced by radioactive material is combined with electric current from the separate source as described in FIGURE 1. The separate source may provide either direct or alternating current.

Referring to FIGURE 2, another embodiment of the present invention is illustrated wherein a metal core 10 is wrapped with a primary coil 12 of insulated radioactive wire (for example, radioactive copper or strontium, etc.). A secondary coil 14, which may be any conventional conductor, such as ordinary copper wire, is placed loosely about core 10 and primary coil 12 and is connected by suitable conductive junctions to workload 16 as shown in FIGURE 3. A separate or electric current source is connected with primary coil 12 in a suitable conductive arrangement. Introduction of current into primary coil 12 produces an electric field about core 10 and induces an amplified current in secondary coil 14 which is greater than that introduced into coil 12 as a result of the effects of the radioactivity of primary coil 12. If desired for greater amplification of the current being introduced into coil 12, secondary coil 14 may also be a radioactive material. Core 10 is preferably of an iron rod but may also, in addition to either or both secondary or primary coi's, be of radioactive material.

Taking schematic FIGURE 2, it can be seen that the arrangement in which the primary and secondary coils are wrapped around core 10 may be substituted for wrappings in an electric motor, thereby providing with a small electrical source greater electrical output and increased efficiency in economy of the motor.

In FIGURE 4, an arrangement similar to that of FIGURES 2 and 3 is illustrated, the difference being that the primary and secondary coils are separate. Core 20 is wrapped with a radioactive primary coil 22 in which an electric current is supplied from battery 24. An electric field is established and electrical current induced into secondary coil 26 from which it may be taken to workload 28, as illustrated in FIGURE 24.

In either the FIGURE 2 or FIGURE 4 embodiment, the amount of amplification will depend upon the amount of radioactive material utilized and the voltage will depend on the number of coils involved, the latter based on well-known principles in this art.

Utilizing the principles of the FIGURE 2 and 4 embodiments, it is possible to increase the efficiency and/or output of an electric generator by constructing the windings from radioactive wire, or constructing the armature or other metal parts which create the magnetic field, from radioactive materials such as radioactive copper, iron, or the like, thereby stimulating the magnetic field and induced current. The same may also be utilized in electric motors to increase efficiency.

The invention may be embodied in other specific forms without departing from the spirit or essential characteristics thereof. The above described embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for amplifying electric current comprising, a metal core, a primary coil of radioactive material around said core, and a secondary coil of conductive material, positioned over said primary coil, and from which electric current induced thereinto from said metal core and primary coil may be transmitted to a workload.

2. Apparatus as defined in claim 1 wherein said metal core is of radioactive material.

3. Apparatus as defined in claim 1 wherein said secondary coil is of radioactive material.

4. Apparatus as defined in claim 1 wherein said metal core and said secondary coil are of radioactive material.

5. Apparatus for amplifying electric current comprising a metal core, a primary coil of radioactive material around said core, a secondary coil of conductive material spaced longitudinally from said primary coil, and positioned around said core.

6. Apparatus as defined in claim 5 wherein said metal core is of radioactive material.

7. Apparatus as defined in claim 5 wherein said secondary coil is of radioactive material.

8. Apparatus as defined in claim 5 wherein said metal core and said secondary coil are of radioactive material.

References Cited

UNITED STATES PATENTS

| 2,548,225 | 4/1951 | Linder | 322—2 X |
| 2,555,116 | 5/1951 | Coleman | 322—2 |
| 2,683,856 | 7/1954 | Kornei | 322—2 |
| 2,810,850 | 10/1957 | Linder | 310—3 X |

LEE T. HIX, *Primary Examiner.*

J. D. TRAMMELL, *Assistant Examiner.*